United States Patent [19]
Anderson

[11] 4,302,229
[45] Nov. 24, 1981

[54] CONTROL OF A FRACTIONAL DISTILLATION COLUMN

[75] Inventor: John E. Anderson, Corpus Christi, Tex.

[73] Assignee: Phillips Petroleum Company, Bartlesville, Okla.

[21] Appl. No.: 165,465

[22] Filed: Jul. 2, 1980

Related U.S. Application Data

[62] Division of Ser. No. 70,543, Aug. 29, 1979, Pat. No. 4,238,212.

[51] Int. Cl.³ .............................................. B01D 3/42
[52] U.S. Cl. ......................................... 62/21; 203/2; 203/DIG. 18; 208/DIG. 1
[58] Field of Search ................ 364/501; 208/DIG. 1; 203/1, DIG. 18, 2, 3; 196/132; 62/21, 37; 202/160, 206; 422/138; 137/7, 113, 114

[56] References Cited
U.S. PATENT DOCUMENTS

| 2,882,693 | 4/1959 | Clay | 203/DIG. 18 |
| 2,885,863 | 5/1959 | Berger | 203/DIG. 18 |
| 3,143,643 | 8/1964 | Fluegel et al. | 203/DIG. 18 |
| 3,411,308 | 11/1968 | Bellinger | 62/21 |
| 3,420,748 | 1/1969 | Johnson et al. | 203/1 |
| 3,427,228 | 2/1969 | Constantikes et al. | 203/1 |

Primary Examiner—Frank Sever

[57] ABSTRACT

A control system for a fractional distillation column, where the feed to the fractional distillation column is supplied from at least one separator, is disclosed in which overloading of the fractional distillation column is prevented by monitoring a control parameter associated with the fractional distillation column which indicates that the fractional distillation column is being overloaded. The flow of the feed from the at least one separator is manipulated to maintain the control parameter which indicates that the fractional distillation column is being overloaded within desired limits. The feed to the at least one separator is manipulated to maintain the liquid level in the at least one separator within desired limits.

19 Claims, 3 Drawing Figures

CONTROL OF A FRACTIONAL DISTILLATION COLUMN

This application is a division of application Ser. No. 70,543, filed Aug. 29, 1979, now U.S. Pat. No. 4,238,212.

This invention relates to method and apparatus for controlling a fractional distillation column. In one aspect this invention relates to method and apparatus for preventing overloading of a fractional distillation column where the feed to the fractional distillation column is supplied from at least one separator.

In chemical manufacturing processes in which fractional distillation columns are employed to make desired separations, the rate at which a product can be produced is often the parameter by which the economic viability of the process is determined. It is thus quite common to run the fractional distillation columns very close to their flood points. A control scheme is needed which will quickly unload the fractional distillation columns when flooding is detected to prevent product contamination. In the past, it has been common to simply measure some parameter associated with the fractional distillation column which gives an indication that the fractional distillation column is beginning to flood. The pressure differential across a fractional distillation column or an analysis of the product flowing from the fractional distillation column are two common measurements which are utilized to indicate that a fractional distillation column is beginning to flood or is close to flooding. Typically, when the measured parameter indicates that the fractional distillation column is beginning to flood, the feed rate to the process is reduced to thereby unload the fractional distillation column. However, the simple scheme of measuring a column parameter and adjusting the plant feed is too slow to prevent serious flooding from occurring where the plant feed is being provided to at least one separator with the fractional distillation column feed being supplied from the at least one separator.

It is thus an object of this invention to provide method and apparatus for preventing overloading of a fractional distillation column where the feed to the fractional distillation column is supplied from at least one separator.

Both the brief description of the invention and the detailed description of the invention are given in terms of an ethylene manufacturing process in which it is desired to prevent flooding of the demanthizer and the ethylene fractionator. However, the invention is applicable to other chemical manufacturing processes in which the feed to at least one fractional distillation column in the process is supplied from at least one separator.

In a typical ethylene manufacturing process, hydrocarbons are provided as a feed to cracking furnaces in which the feed is converted to a gaseous mixture which primarily contains hydrogen, methane, ethylene, ethane, propylene, propane, butadiene and small amounts of heavier gases. At the furnace exit, this gaseous mixture is cooled which allows removal of most of the heavier gases, and compressed. The compressed mixture is then routed to a plurality of separators. From the separators, the gaseous mixture is routed through various distillation columns where the individual components, such as ethylene, are purified and separated. Typically, methane will be removed in a demethanizer column, propane and heavier components are removed in a deethanizer column and then the ethane and ethylene are split in an ethylene fractionator.

In accordance with the present invention, method and apparatus is provided whereby flooding of the demethanizer column and flooding of the ethylene fractionator is substantially prevented. The pressure differential across the demathanizer column is utilized to provide an indication of when flooding is beginning to occur in the demethanizer. If the pressure differential across the demethanizer indicates that flooding is beginning, the flow rate of the feed to the demethanizer from the plurality of separators is reduced. The flow rate of the plant feed is also reduced to maintain the liquid level in the plurality of separators within desired limits. Control of the flow rate of the feed flowing from the plurality of separators to the demethanizer provides a quick response to flooding conditions in the demethanizer. The longer term unloading of the demethanizer is provided by reducing the flow rate of the process feed flowing to the cracking furnaces.

An analysis of the ethylene in the ethane product flowing from the ethylene fractionator is utilized to indicate when flooding is occurring in the ethylene fractionator. When the ethylene concentration in the ethane product goes above a desired limit, the flow rate of the feed flowing from the plurality of separators to the demethanizer is again reduced which has the effect of reducing the flow rate of the feed to the ethylene fractionator. The reduction in the feed from the separators to the demethanizer column allows the ethylene fractionator to be quickly unloaded which substantially prevents flooding of the ethylene fractionator. Longer term unloading of the ethylene fractionator is provided by reducing the feed flow rate to the cracking furnaces so as to maintain the liquid level in the plurality of separators at a desired level.

Other objects and advantages of the invention will be apparent from the foregoing brief description of the invention and the appended claims as well as from the detailed description of the drawings in which:

Although the invention is illustrated and described in terms of a specific ethylene manufacturing process and a specific control system for the ethylene manufacturing process, the invention is also applicable to different types and configurations of ethylene manufacturing processes as well as different types of control system configurations which accomplish the purpose of the present invention. Lines designated as signal lines in the drawings are either electrical or pneumatic in this preferred embodiment. However, the invention is also applicable to mechanical, hydraulic or other signal means for transmitting information. In almost all control systems some combination of these types of signals will be used. However, use of any other type of signal transmission, compatible with the process and equipment in use is within the scope of the invention.

A digital computer is used in the preferred embodiment of this invention to calculate the required control signals based on measured process parameters as well as set points supplied to the computer. Analog computers or other types of computing devices could also be used in the invention.

Both the analog and digital controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E dt$$

where
S = output control signals;
E = difference between two input signals; and
$K_1$ and $K_2$ = constants.

The scaling of an output signal by a controller is well known in control systems art. Essentially, the output of a controller may be scaled to represent any desired factor or variable. An example of this is where a desired pressure and an actual pressure is compared by a controller. The output could be a signal representative of a desired change in the flow rate of some fluid necessary to make the desired and actual pressures equal. On the other hand, the same output signal could be scaled to represent a percentage or could be scaled to represent a temperature change required to make the desired and actual pressures equal. If the controller output can range from 3 to 15 lbs, which is typical, then the output signal could be scaled so that an output signal having a pressure of 9 lbs. corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other types of equipment or combinations of one or more of such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of a particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Figure 1A:
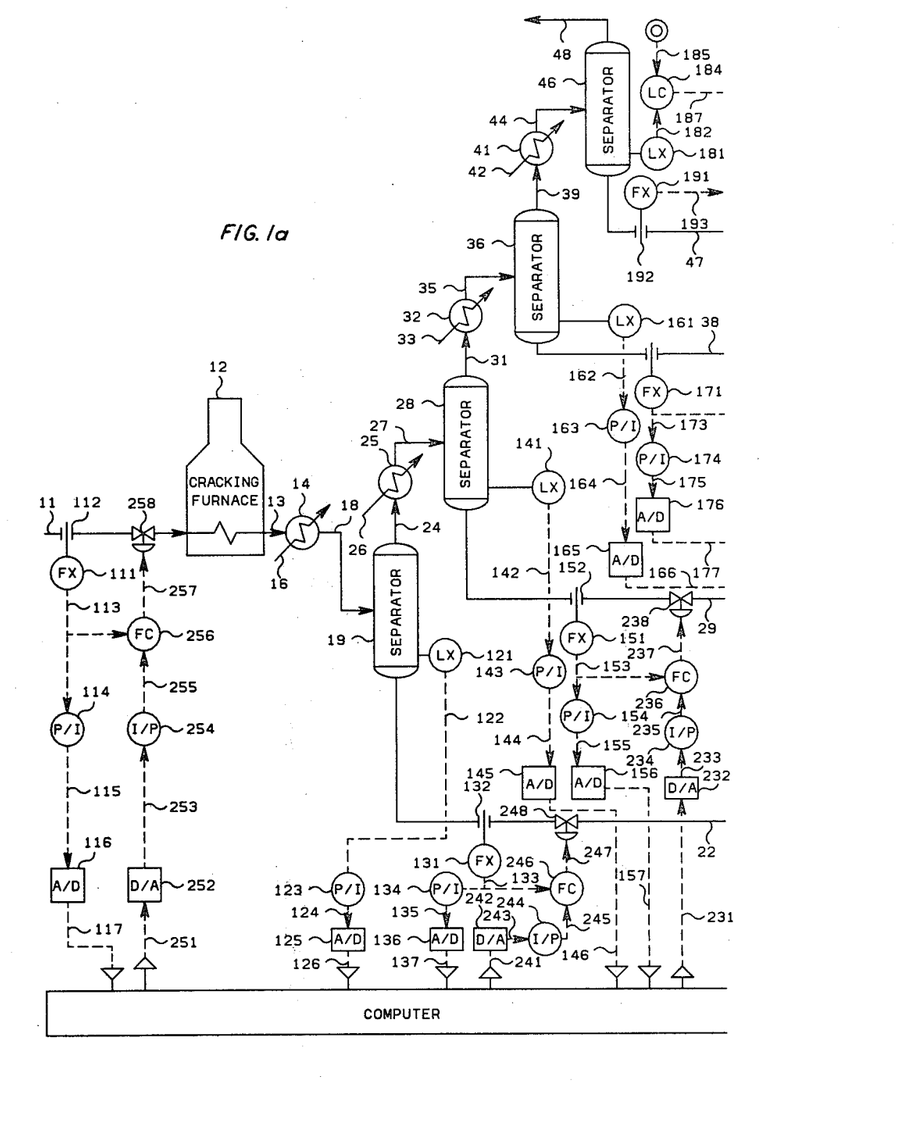
FIGS. 1a and 1b taken together are a schematic diagram of an ethylene manufacturing process with an associated control system.
Figure 1B:
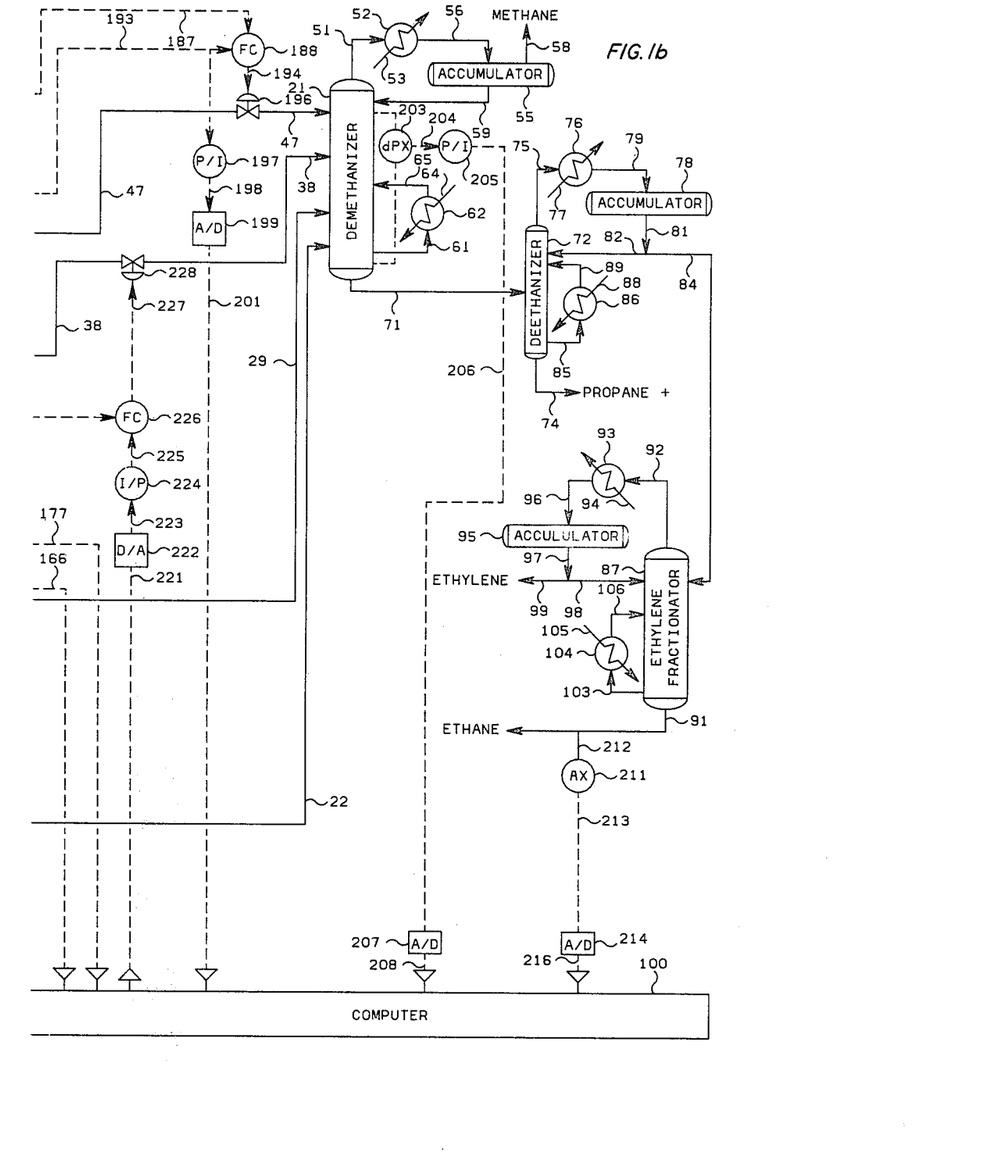

Referring now to the drawings, and in particular to FIGS. 1a, and 1b as a single drawing, a hydrocarbon feed is provided through conduit means 11 to the cracking furnace 12. The feed flowing through conduit means 11 is cracked in the cracking furnace 12 into a gaseous mixture which primarily contains hydrogen, methane, ethylene, ethane, propylene, propane, butadiene and small amounts of heavier gases. The heavier gases are typically removed and acid gases are also removed from the effluent flowing from the cracking furnace through conduit means 13. The effluent flowing through conduit means 13 will typically be compressed and then will be cooled by passing through the heat exchanger 14. A cooling medium is provided to the heat exchanger 14 through conduit means 16. From the heat exchanger 14 the gaseous mixture is provided through conduit means 18 to the separator 19. The feed stream flowing through conduit means 18 will typically be principally made up of methane, ethylene and ethane. The heat exchanger 14 is utilized to condense at least a portion of the gaseous mixture flowing from the cracking furnace 12. The condensed components of the feed stream flowing through conduit means 18 are provided from the separator 19 to the demethanizer 21 through conduit means 22. The portion of the feed stream flowing through conduit means 18 which is still in vapor form is supplied from the separator 19 through conduit means 24 to the heat exchanger 25. The heat exchanger 25 is provided with a cooling medium flowing through conduit means 26. The cooling medium flowing through conduit means 26 serves to condense at least a part of the vapor flowing through conduit means 24. The partially condensed fluid stream is provided from the heat exchanger 25 through conduit means 287 to the separator 28. From the separator 28, the liquid portion of the fluid stream flowing through conduit means 27 is provided through conduit means 29 to the demethanizer 21. The vapor portion of the fluid stream flowing through conduit means 27 is provided through conduit means 31 to the heat exchanger 32. A cooling medium is provided to the heat exchanger 32 through conduit means 33. The cooling medium is used to condense at least a portion of the vapor stream flowing through conduit means 31. The partially condensed fluid stream is provided from the heat exchanger 32 through conduit means 35 to the separator 36. The liquid portion of the fluid stream flowing through conduit means 35 is provided from the separator 36 through conduit means 38 to the demethanizer 21. The vapor portion of the fluid stream flowing through conduit means 35 is provided from the separator 36 through conduit means 39 to the heat exchanger 41. The heat exchanger 41 is provided with a cooling medium through conduit means 42. The cooling medium is used to condense at least a portion of the vapor stream flowing through conduit means 39. The partially condensed fluid stream is provided from the heat exchanger 41 through conduit means 44 to the separator 46. The condensed portion of the fluid stream flowing through conduit means 44 is provided through conduit means 47 to the demethanizer 21. The portion of the fluid stream flowing through conduit means 44 which remains in vapor form is provided from the separator 46 through conduit means 48 to another portion of the ethylene manufacturing process.

The feed stream flowing through conduit means 22 will contain a lower concentration of methane than will be contained in the feed streams flowing through conduit means 29, 38 and 47. Thus, the feed stream flowing through conduit means 22 is provided to a lower portion of the demethanizer 21. The feed stream flowing through conduit means 47 will contain a higher percentage of methane than the remaining feed streams provided to the demethanizer 21. Thus, the feed stream flowing through conduit means 47 is provided to an upper portion of the demethanizer 21. The feed streams flowing through conduit means 29 and 38 are provided to intermediate portions of the demethanizer 21. The feed flowing through conduit means 38 will contain a higher percentage of methane than will the feed flowing through conduit means 29.

The demethanizer 21 substantially separates the methane in the feed streams flowing to the demethanizer 21 from the ethane and ethylene in the feed streams. The overhead stream from the demethanizer 21, which flows through conduit means 51, will thus be principally methane. The overhead stream flowing through conduit means 51 is provided from the demethanizer 21 to the heat exchanger 52. The heat exchanger 52 is provided with a cooling fluid through conduit means 53. The partially condensed fluid stream from the heat exchanger 52 is provided to the accumulator 55 through conduit means 56. The portion of the fluid stream flowing through conduit means 56 which remains in vapor form is withdrawn from the accumulator 55 through conduit means 58 and is provided to another section of the ethylene manufacturing process. The liquid portion of the fluid stream flowing through conduit means 56 is withdrawn from the accumulator 55 and is passed through conduit means 59 as an external reflux to the demethanizer 21.

Heat is provided to the demethanizer 21 primarily by recirculating fluid from the bottom of the demethanizer 21 through conduit means 61 to the reboiler 62. A heating medium is supplied to the reboiler 62 through conduit means 64. The thus heated liquid withdrawn from the bottom of the demethanizer 21 is returned to the demethanizer 21 through conduit means 65.

A bottoms product, which will contain primarily ethylene, ethane, and heavier components is provided from the demethanizer 21 through conduit means 71 as a feed to the deethanizer column 72. Heavier components than ethane in the feed flowing through conduit means 71 are removed in the deethanizer 72. Thus, the bottoms product flowing through conduit means 74 from the deethanizer 72 will principally contain propylene and components heavier than propylene. The overhead product flowing from the deethanizer 72 through conduit means 75 will principally contain ethylene and ethane. The overhead stream flowing through conduit means 75 is provided frm the deethanizer 72 to the heat exchanger 76. The heat exchanger 76 is provided with a cooling fluid through conduit means 77. The partially condensed fluid stream from the heat exchanger 76 is provided to the overhead accumulator 78 through conduit means 79. At least a part of the liquid portion of the fluid stream flowing through conduit means 79 is withdrawn from the accumulator 78 and is provided through the combination of conduit means 81 and 82 as external reflux to the deethanizer 72. A second portion of the liquid in the accumulator 78 is withdrawn through the combination of conduit means 81 and 84 and is provided as a feed to the ethylene fractionator 87.

Heat is provided to the deethanizer column 72 by recycling fluid from the bottoms of the deethanizer 72 through conduit means 85 to the reboiler 86. A heating medium is provided to the reboiler 86 through conduit means 88. The thus heated fluid is recycled to the deethanizer 72 through conduit means 89.

The ethane is split from the ethylene in the ethylene fractionator 87. Ethane is removed from the ethylene fractionator as a bottoms product through conduit means 91. Ethylene is removed as an overhead product from the ethylene fractionator 87 through conduit means 92. The overhead stream flowing through conduit means 92 is provided from the ethylene fractionator 87 through conduit means 92 to the heat exchanger 93. The heat exchanger 93 is provided with a cooling medium through conduit means 94. The partially condensed fluid stream from the heat exchanger 93 is provided to the overhead accumulator 95 through conduit means 96. A portion of the liquid in the accumulator 95 is provided through the combination of conduit means 97 and 98 as an external reflux to the ethylene fractionator 87. A second portion of the liquid in the accumulator 95 is removed through the combination of conduit means 97 and 99 as the ethylene product.

Heat is provided to the ethylene fractionator 87 by providing liquid from the bottom of the ethylene fractionator 87 through conduit means 103 to the reboiler 104. A heating medium is provided to the reboiler 104 through conduit means 105. The thus heated fluid is recycled to the ethylene fractionator through conduit means 106.

The ethylene manufacturing process described to this point is a conventional ethylene manufacturing process. It is the manner in which the ethylene manufacturing process, illustrated in FIGS. 1a and 1b, is controlled so as to prevent flooding of the demethanizer 21 or the ethylene fractionator 87 which provides the novel features of the present invention.

Control of the ethylene manufacturing process, illustrated in FIGS. 1a and 1b, is generally accomplished by measuring a plurality of parameters associated with the ethylene manufacturing process and supplying the measured parameters to computer means 100. Computer means 100 is also supplied with a plurality of set point signals, which are representative of desired operating characteristics for the ethylene manufacturing process illustrated in FIGS. 1a and 1b. In response to the measured inputs and the set point inputs, computer means 100 calculates the flow rate for the feed flowing through conduit means 22, 29 and 38 required to prevent flooding of the demethanizer 21 or the ethylene fractionator 87. Computer means 100 also calculates the flow rate of the feed flowing through conduit means 11 required to maintain the liquid level in the separators 19, 28, 36 and 46 within desired limits.

Flow transducer 11, in combination with the flow sensor 112 which is operably located in conduit means 11, provides an output signal 113 which is representative of the flow rate of the feed flowing through conduit means 11. Signal 113 is provided from the flow transducer 111 to the pressure-to-current (P/I) transducer 114. Signal 113 is converted from pneumatic form to electrical form and is provided as signal 115 to the analog-to-digital (A/D) converter 116. Signal 115 is converted from analog form to digital form and is provided as signal 117 to computer means 100.

Level transducer 121 provides an output signal 122 which is representative of the liquid level in the separator 19. Signal 122 is provided as an input to the P/I transducer 123. Signal 122 is converted from analog form to digital form and is provided as signal 124 to the A/D converter 125. Signal 124 is converted from analog form to digital form and is provided as signal 126 to computer means 100.

The flow transducer 131, in combination with the flow sensor 132 which is operably located in conduit means 22, provides an output signal 133 which is representative of the flow rate of the feed flowing through conduit means 22. Signal 133 is provided from the flow transducer 131 as an input to the P/I transducer 134. Signal 133 is converted from pneumatic form to electrical form and is provided as signal 135 to the A/D converter 136. Signal 135 is converted from analog form to digital form and is provided as signal 137 to computer means 100.

Level transducer 141 provides an output signal 142 which is representative of the liquid level in the separator 28. Signal 142 is provided as an input to the P/I transducer 143. Signal 142 is converted from pneumatic form to electrical form and is provided as signal 144 to the A/D converter 145. Signal 144 is converted from analog form to digital form and is provided as signal 146 to computer means 100.

The flow transducer 151, in combination with the flow sensor 152 which is operably located in conduit means 29, provides an output signal 153 which is representative of the flow rate of the feed flowing through conduit means 29. Signal 153 is provided from the flow transducer 151 as an input to the P/I transducer 154. Signal 153 is converted from pneumatic form to electrical form and is provided as signal 155 to the A/D converter 156. Signal 155 is converted from analog form to digital form and is provided as signal 157 to computer means 100.

Level transducer 161 provides an output signal 162 which is representative of the liquid level in the separator 36. Signal 162 is provided as an input to the P/I transducer 163. Signal 162 is converted from pneumatic form to electrical form and is provided as signal 164 to the A/D converter 165. Signal 164 is converted from analog form to digital form and is provided as signal 166 to computer means 100.

The flow transducer 171, in combination with the flow sensor 172 which is operably located in conduit means 38, provides an output signal 173 which is representative of the flow rate of the feed flowing through conduit means 38. Signal 173 is provided from the flow transducer 171 as an input to the P/I transducer 174. Signal 173 is converted from pneumatic form to electrical form and is provided as signal 175 to the A/D converter 176. Signal 175 is converted from analog form to digital form and is provided as signal 177 to computer means 100.

Level transducer 181 provides an output signal 182 which is representative of the liquid level in the separator 46. Signal 182 is provided from the level transducer 181 as an input to the level controller 184. The level controller 184 is also provided with a set point signal 185 which is representative of the desired liquid level in the separator 46. In response to signals 182 and 185, the level controller 184 provides an output signal 187 which is responsive to the difference between signals 185 and 182. Signal 187 is provided from the level controller 184 as an input to the flow controller 188.

The flow transducer 191, in combination with the flow sensor 192 which is operably located in conduit means 47, provides an output signal 193 which is representative of the flow rate of the feed flowing through conduit means 47. Signal 193 is provided as a second input to the flow controller 188. In response to the signals 187 and 193, the flow controller 188 provides an output signal 194 which is responsive to the difference between signals 187 and 193. Signal 194 is provided to the pneumatic control valve 196 which is operably located in conduit means 47. The pneumatic control valve 196 is manipulated in response to signal 194 to thereby maintain the liquid level in the separator 46 at the desired liquid level represented by the set point signal 185.

It is noted that the feed flow rate through conduit means 47 will be very small and thus this flow rate is not placed under computer control as it will have little effect on the liquid level in the demethanizer 21.

Signal 193 from the flow transducer 191 is also provided as an input to the P/I transducer 197. Signal 193 is converted from pneumatic form to electrical form and is provided as signal 198 to the A/D converter 199. Signal 198 is converted from analog form to digital form and is provided as signal 201 to computer means 100.

The differential pressure transducer 203 provides an output signal 204 which is representative of the differential pressure across the demethanizer 21. The pressure at the lower portion of the demethanizer 21 will be higher than the pressure at the upper portion of the demethanizer 21. If the demethanizer 21 begins to flood, the pressure in the lower portion of the demethanizer 21 will begin to rise because of the liquid head which is building up in the demethanizer 21. The differential pressure, represented by signal 204, will thus begin to increase and this will provide an indication that the demethanizer 21 is beginning to flood.

Signal 204 is provided from the differential pressure transducer 203 as an input to the P/I transducer 205. Signal 204 is converted from pneumatic form to electrical form and is provided as signal 206 to the A/D converter 207. Signal 206 is converted from analog form to digital form and is provided as signal 208 to computer means 100.

The analyzer transducer 211, which is operably connected to conduit means 91 through conduit means 212, provides an output signal 213 which is representative of the concentration of ethylene in the effluent flowing through conduit means 91. A rise in the concentration of ethylene in the effluent flowing through conduit means 91 provides an indication that the ethylene fractionator is beginning to flood thus reducing the ability of the ethylene fractionator to separate the ethylene and ethane. Signal 213 is provided from the analyzer transducer 211 as an input to the A/D converter 214. Signal 213 is converted from analog form to digital form by the A/D converter 214 and is provided as signal 216 to computer means 100.

In response to the described inputs, computer means 100 calculates four control signals which are utilized in controlling the ethylene manufacturing process illustrated in FIGS. 1a and 1b. A first signal calculated by computer means 100 is the required flow rate of the feed flowing through conduit means 38. Signal 221, which is representative of the required flow rate of the feed flowing through conduit means 38, is provided from computer means 100 to the digital-to-analog (D/A) converter 222. Signal 221 is converted from digital form to analog form and is provided as signal 223 to the current-to-pressure (I/P) transducer 224. Signal 223 is converted from electrical form to pneumatic form by the I/P transducer 224 and is provided as signal 225 to the flow controller 226. The flow controller 226 is also provided with signal 173 which is representative of the actual flow rate of the feed flowing through conduit means 38. In response to signals 225 and 173, the flow controller 226 provides an output signal 227 which is responsive to the difference between signals 225 and 173. Signal 227 is provided from the flow controller 226 to the pneumatic control valve 228 which is operably located in conduit means 38. The pneumatic control valve 228 is manipulated in response to signal 227 to thereby maintain the actual flow rate of the feed flowing through conduit means 38 substantially equal to the required flow rate represented by signal 221.

A second signal calculated by computer means 100 is the required flow rate of the feed flowing through conduit means 29. Signal 231, which is representative of the required flow rate of the feed flowing through conduit means 29, is provided from computer means 100 to the D/A converter 232. Signal 231 is converted from digital form to analog form and is provided as signal 233 to the I/P transducer 234. Signal 233 is converted from electrical form to pneumatic form by the I/P transducer 234 and is provided as signal 235 to the flow controller 236. The flow controller 236 is also provided with signal 155 which is representative of the actual flow rate of the feed flowing through conduit means 29. In response to signals 235 and 153, the flow controller 236 provides an output signal 237 which is responsive to the difference between signals 235 and 153. Signal 237 is provided from the flow controller 236 to the pneumatic control valve 238 which is operably located in conduit means 29. The pneumatic control valve 238 is manipulated in response to signal 237 to thereby maintain the actual flow rate of the feed flowing through conduit means 29 substantially equal to the required flow rate represented by signal 231.

A third signal calculated by computer means 100 is the required flow rate of the feed flowing through conduit means 22. Signal 241, which is representative of the required flow rate of the feed flowing through conduit means 22, is provided from computer means 100 to the D/A converter 242. Signal 241 is converted from digital form to analog form and is provided as signal 243 to the I/P transducer 244. Signal 243 is converted from electrical form to pneumatic form by the I/P transducer 244 and is provided as signal 245 to the flow controller 246. The flow controller 246 is also provided with signal 133 which is representative of the actual flow rate of the feed flowing through conduit means 22. In response to signals 245 and 133, the flow controller 246 provides an output signal 247 which is responsive to the difference between signals 245 and 133. Signals 247 is provided from the flow controller 246 to the pneumatic control valve 248 which is operably located in conduit means 22. The pneumatic control valve 248 is manipulated in response to signal 247 to thereby maintain the actual flow rate of the feed flowing through conduit means 22 substantially equal to the required flow rate represented by signal 241.

A fourth signal calculated by computer means 100 is the required flow rate of the feed flowing through conduit means 11. Signal 251, which is representative of the required flow rate of the feed flowing through conduit means 11, is provided from computer means 100 to the D/A converter 252. Signal 251 is converted from digital form to analog form and is provided as signal 253 to the I/P transducer 254. Signal 253 is converted from electrical form to pneumatic form by the I/P transducer 254 and is provided as signal 255 to the flow controller 256. The flow controller 256 is also provided with signal 113 which is representative of the actual flow rate of the feed flowing through conduit means 11. In response to signals 255 and 113, the flow controller 256 provides an output signal 257 which is responsive to the difference between signals 255 and 113. Signal 257 is provided from the flow controller 256 to the pneumatic control valve 258 which is operably located in conduit means 11. The pneumatic control valve 258 is manipulated in response to signal 257 to thereby maintain the actual flow rate of the feed flowing through conduit means 11 substantially equal to the required flow rate represented by signal 251.

Figure 2:
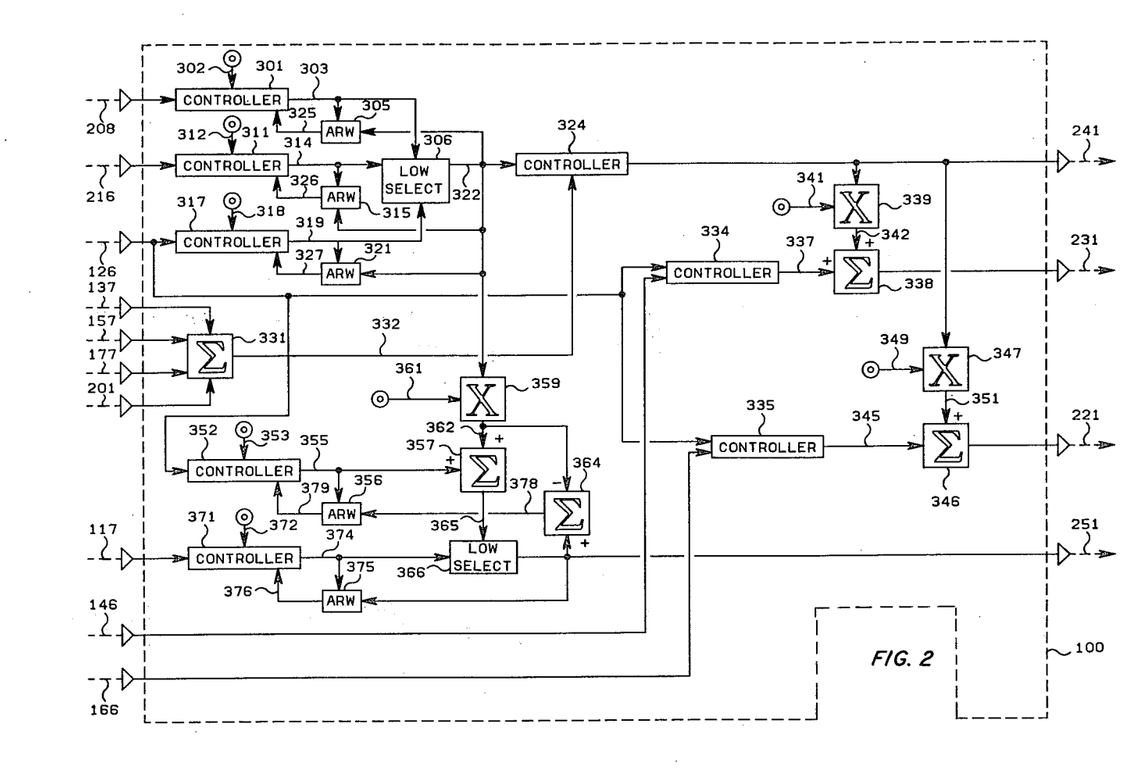
FIG. 2 is a logic diagram for the computer logic utilized to generate the control signals utilized in the control of the ethylene manufacturing process illustrated in FIGS. 1a and 1b.

The computer logic utilized to calculate the described control signals in response to the inputs to the computer is illustrated in FIG. 2. Essentially, the flow rate of the feed flowing from the plurality of separators to the demethanizer 21 is manipulated so as to prevent flooding of the demethanizer 21 and the ethylene fractionator 87. This control is based either on the analysis of the ethane stream flowing through conduit means 91 or the pressure differential across the demethanizer 21 depending on whether the demethanizer 21 or the ethylene fractionator 87 is closer to flooding. The flow rate of the process feed flowing through conduit means 11 is manipulated so as to maintain the level in the plurality of separators within desired limits. If neither the demethanizer 21 or the ethylene fractionator 87 is beginning to flood, the flow rate of the process feed flowing through conduit means 11 is maintained equal to a desired set point for the process feed flowing to the ethylene manufacturing process through conduit means 11.

Referring now to FIG. 2, signal 208, which is representative of the pressure differential across the demethanizer 21 is provided as an input to the controller block 301 which is a digital implementation of a proportional-integral controller. The controller block 301 is also provided with a set point signal 302 which is representative of the maximum allowable pressure differential across the demethanizer 21. In response to signals 208 and 302, the controller block 301 provides an output signal 303 which is responsive to the difference between signals 208 and 302. Signal 303 is provided as a first input to the anti-reset windup block 305 and is also supplied as a first input to the low select block 306.

Signal 216 which is representative of the concentration of ethylene in the ethane flowing through conduit means 91 is provided as an input to the controller block 311 which is a digital implementation of a proportional-integral controller. The controller block 311 is also provided with a set point signal 312 which is representative of the set point for the ethylene concentration in the ethane flowing through conduit means 91. In response to signals 216 and 312, the controller block 311 provides an output signal 314 which is responsive to the difference between signals 216 and 312. Signal 314 is provided as a first input to the anti-reset windup block 315 and is also provided as a second input to the low select block 306.

Signal 126, which is representative of the liquid level in separator 19, is provided as an input to the controller block 317 which is a digital implementation of a proportional-integral controller. The controller block 317 is also provided with a set point signal 318 which is representative of the low limit for the liquid level in separator 19. In response to signals 126 and 318 the controller 317 provides an output signal 319 which is responsive to the difference between signals 126 and 318. Signal 319 is provided as a first input to the anti-reset windup block 321 and as an third input to the low select block 306.

The lower of signals 303, 314 or 319 is selected by the low select block 306 and is provided as signal 322 from the low select block 306. Signal 322 is provided as an input to the controller block 324 and is also provided as a second input to the anti-reset windup blocks 305, 315 and 321.

The function of the anti-reset windup blocks 305, 315 and 321 is well known in control art. When the output of at least two controllers is provided to a selecting device, the controller not selected will typically continue to integrate or "wind up". This wind up is prevented by the anti-reset windup blocks 305, 315 and 321. Essentially, the anti-reset windup block 305 compares signals 322 and 303. If signal 303 is equal to signal 322 then the controller block 301 is allowed to continue to integrate. If signal 303 does not equal signal 322, indicating that the output from the controller block 301 has not been selected, then the output signal 325 from the anti-reset windup block 305 will disable the integrator of the controller block 301. In like manner, the output signal 326 from the anti-reset windup block 315 disables the integrator of the controller block 311 if signal 314 does not equal signal 322 and the output signal 327 from the anti-reset windup block 321 disables the integrator of the controller block 317 if signal 319 does not equal signal 322.

Signals 137, 157, 177 and 201 which are representative of the flow rate of the feed flowing through conduit means 22, 29, 38 and 47, respectively, are provided as inputs to the summing block 331. Signals 137, 157, 177, and 201 are summed to provide signal 332 which is representative of the total feed flow rate to the demethanizer 21. Signal 332 is provided as a second input to the controller block 324. Signal 332 may be considered the process variable input to the controller block 324 while signal 322 is considered the set point input to the controller block 324. In response to signals 322 and 332 the controller block 324 provides the output signal 241 which is responsive to the difference between signals 322 and 332. Signal 241, which is representative of the desired flow rate of the feed flowing through conduit means 22, is provided as an output from computer means 100 and is utilized as previously described.

Signal 126, which is representative of the liquid level in separator 19, is also provided as a set point input to the controller block 334 and the controller block 335. Signal 146, which is representative of the liquid level in separator 28, is provided as a process variable input to the controller block 334. In response to signals 126 and 146, the controller block 334 provides an output signal 337 which is responsive to the difference between signals 126 and 146. Signal 337 is provided as a first input to the summing block 338. Signal 241 is also provided as an input to the multiplying block 339. The multiplying block 339 is also provided with signal 341 which is representative of the ratio of the density of the liquid in separator 28 multiplied by the volume of liquid in separator 28 to the density of the liquid in separator 19 multiplied by the volume of liquid in separator 19. Signal 241 is multiplied by signal 341 to establish signal 342. Signal 342 is provided as a second input to the summing block 338. Signal 341 is utilized to compensate for any differences between the volume of liquid in separators 19 and 28 and the density of the liquid in separator 19 and 28. Signal 342 is summed with signal 337 to establish signal 231 which is representative of the desired flow rate of the feed through conduit means 29. Signal 231 is provided as an output from computer means 100 and is utilized as previously described.

Signal 166 which is representative of the liquid level in separator 36 is provided as the process variable input to controller block 335. In response to signals 126 and 166, the controller 335 provides an output signal 345 which is responsive to the difference between signals 126 and 166. Signal 345 is provided as an input to the summing block 346.

Signal 241 is also provided as an input to the multiplying block 347. The multiplying block 347 is also provided with signal 349 which is representative of the ratio of the density of the liquid in separator 36 multiplied by the volume of separator 36 to the density of the liquid in separator 19 multiplied by the volume of separator 19. Signal 241 is multiplied by signal 349 to establish signal 351. Signal 349 is utilized to compensate for differences between the density of the liquids in separators 19 and 36 and the volume of liquid in separators 19 and 36. The signal 351 is summed with signal 345 to establish signal 221 which is representative of the desired flow rate of the feed flowing through conduit means 38. Signal 221 is provided as an output from computer means 100 and is utilized as previously described.

Signal 322 from the low select 306 may be considered a prediction of the desired flow rate of feed to the demethanizer 21. Signal 322 may thus be considered a feed forward control signal. Signal 322 is compared to the actual feed flow rate to the demethanizer 21 by the controller block 324 and this comparison is utilized to manipulate the flow rate of the feed flowing through conduit means 22. As the flow rate of the feed flowing through conduit means 22 changes, the liquid level in separator 19 will begin to change. This will have an effect on signal 126 which is provided as a set point to the controller blocks 334 and 335. The controller blocks 334 and 335 act to maintain the liquid level in separators 28 and 36 equal to the liquid level in separator 19. Thus, the control on the feed flow rate to the demethanizer acts to maintain the feed flow rate to the demethanizer 21 equal to a predicted desired feed flow rate and also acts to maintain the liquid level in separators 19, 28 and 36 equal.

The output from the controller block 317 acts as a protective signal to prevent the separators 19, 28 and 36 from beginning drained. The output from the controller block 311 is utilized to prevent flooding of the ethylene fractionator 87 while the output from the controller block 301 is utilized to prevent flooding of the demethanizer 21. In general, either signal 314 or signal 303 will be selected as signal 322. The control signal utilized to prevent flooding in the column which is closest to flooding will typically be selected by the low select block 322.

Signal 126, which is representative of the liquid level in separator 19, is also provided as a process variable input to the controller block 352. The controller block 352 is also provided with a set point signal 353 which is representative of a high limit on the liquid level in separator 19. In response to signals 126 and 353, the controller block 352 provides an output signal 355 which is responsive to the difference between signals 126 and 353. Signal 355 is provided as an input to the anti-reset windup block 356 and is also provided as an input to the summing block 357.

Signal 322, which is representative of the predicted desired total flow rate to the demethanizer 21, is also provided as an input to the multiplying block 359. The multiplying block 359 is also provided with signal 361 which is representative of the pounds of plant feed which must be supplied through conduit means 11 to supply a pound of feed to the demethanizer 21. Signal 361 will typically be a number greater than 1. Signal 322 is multiplied by signal 361 to establish signal 362 which is representative of the predicted desired total plant feed. Signal 362 is provided as an input to the summing block 357 and is also supplied as an input to the summing block 364. Signal 355 is summed with a signal 362 to establish signal 365 which is representative of the corrected predicted desired plant feed. Signal 355 essentially acts as a biasing term or feedback term to correct the predicted desired total plant feed represented by signal 362. Signal 365 is supplied as an input to the low select block 366.

Signal 117, which is representative of the total plant feed flowing through conduit means 11, is provided as an input to the controller block 371. The controller block 371 is also provided with a set point signal 372 which is representative of the desired total plant feed. In response to signals 117 and 372, the controller block 371 provides an output signal 374 which is responsive to the difference between signals 117 and 372. Signal 374 is provided as an input to the anti-reset windup block 375 and is also supplied as an input to the low select block 366. The lower of signals 365 or 374 is selected by the low select block 366 and is provided as signal 251. Signal 251, which is representative of the set point for the plant feed flowing through conduit means 11, is provided as an output from computer means 100 and is utilized as previously described. Signal 251 is also provided as an input to the anti-reset windup block 375 and to the minuend input of the summing block 364. Signal 374 is compared to signal 251 by the anti-reset windup block 375. The output signal 376 from the anti-reset windup block 375 is utilized to disable the integrator of the controller block 371 if signal 374 does not equal signal 251.

Signal 362 is subtracted from 366 to establish signal 378 which is provided as an input to the anti-reset windup block 356. The anti-reset windup block 356 compares signals 355 and 378. The output signal 379 from the anti-reset windup block 356 is utilized to disable the integrator of the controller block 352 if signal 355 does not equal signal 378.

If the demethanizer column 21 or the ethylene fractionator 87 are not beginning to flood, the feed flow rate to the plant through conduit means 11 will typically be controlled in response to signal 374. Only if the demethanizer column 21 or the ethylene fractionator 87 are beginning to flood will the control of the total plant feed be based on the predicted desired total plant feed represented by signal 362. Signal 362 is biased by signal 355 to insure that the liquid level in the separators is maintained within acceptable limits.

The invention has been described in terms of a preferred embodiment as illustrated in FIGS. 1a, 1b and 2. Specific components used in the practice of the invention as illustrated in FIGS. 1a and 1b such as flow sensors 112, 132, 152, 172, and 192; flow transducers 111, 131, 151, 171, and 191; flow controllers 256, 246, 236, 226 and 188; pneumatic control valves 258, 248, 238, 228 and 196; level transducers 121, 141, 161 and 181; level controller 184; pressure-to-current transducers 114, 123, 143, 163, 197 and 205; current-to-pressure transducers 254, 244, 234, and 224 and differential pressure transducer 203 are each well known, commercially available control components such as are described at length in Perry's Chemical Engineer's Handbook, 4th Edition, Chapter 22, McGraw-Hill. Other components are as follows:

| | |
|---|---|
| A/D Converters 116, 125, 136, 156, 145, 165, 176, 199, 207 and 214 | MM5357 8-bit A/D converter National Semiconductor |
| Digital-to-Analog Converters 252, 242, 232 and 222 | AD559 8-bit D/A converter Analog Devices |
| Analyzer Transducer 211 | Optichrom 102 chromatograph Applied Automation, Inc. |
| Computer Means 100 | Optrol 3600 Applied Automation, Inc. |

For reasons of brevity, conventional auxiliary fractionation equipment such as pumps, heat exchangers, additional measurement-control devices, etc. have not been included in the above description as they play no part in the explanation of the invention. In particular, other conventional steps of an ethylene manufacturing process which play no part in the present invention have not been included.

While the invention has been described in terms of the presently preferred embodiment, reasonable variations and modifications are possible by those skilled in the art within the scope of the described invention and the appended claims. Variations such as using an analog computer to perform the required calculations is within the scope of the invention.

That which is claimed is:

1. A method for preventing flooding of a fractional distillation column means and maintaining the liquid level in at least one separator means, from which the feed to said fractional distillation column means is supplied, within desired limits comprising the steps of:
   supplying a first feed stream to said at least one separator means;
   supplying a second feed stream from said at least one separator means to said fractional distillation column means;
   establishing a first signal representative of the predicted desired flow rate of said second feed stream required to prevent flooding of said fractional distillation column means;
   establishing a second signal representative of the actual flow rate of said second feed stream;
   using computing means to compare said first signal and said second signal and establish a third signal responsive to the difference between said first signal and said second signal;

manipulating the flow rate of said second feed stream in response to said third signal;

establishing a fourth signal representative of the predicted desired flow rate of said first feed stream required to prevent flooding of said fractional distillation column means;

establishing a fifth signal representative of a correction factor utilized to maintain the liquid level in said at least one separator within desired limits;

using computing means to combine said fourth signal and said fifth signal to establish a sixth signal representative of a modified predicted desired flow rate of said first feed stream required to both prevent flooding of said fractional distillation column means and required to maintain the liquid level in said at least one separator means within desired limits;

establishing a seventh signal representative of the actual flow rate of said first feed stream;

using computing means to compare said sixth signal and said seventh signal and establish an eighth signal responsive to the difference between said sixth signal and said seventh signal; and manipulating the flow rate of said first feed stream in response to said eighth signal.

2. A method in accordance with claim 1 wherein said step of establishing said first signal comprises:

establishing a ninth signal representative of the differential pressure across said fractional distillation column means;

establishing a tenth signal representative of the maximum allowable differential pressure across said fractional distillation column means to prevent flooding of said fractional distillation column means; and comparing said ninth signal and said tenth signal and establishing said first signal responsive to the difference between said ninth signal and said tenth signal.

3. A method in accordance with claim 1 wherein said step of establishing said first signal comprises:

establishing a ninth signal representative of the concentration of at least one constituent in a stream flowing from said fractional distillation column means;

establishing a tenth signal representative of the concentration of said first constituent which indicates that said fractional distillation column means is beginning to flood; and comparing said ninth signal and said tenth signal and establishing said first signal responsive to the difference between said ninth signal and said tenth signal.

4. A method in accordance with claim 1 wherein said step of establishing said fourth signal comprises:

establishing a ninth signal representative of the ratio of the number of pounds of said first feed stream which must be supplied to said at least one separator means to supply a pound of feed to said fractional distillation column means; and multiplying said first signal by said ninth signal to establish said fourth signal.

5. A method in accordance with claim 4 wherein said step of establishing said fifth signal comprises:

establishing a tenth signal representative of the actual liquid level in said at least one separator means;

establishing an eleventh signal representative of a high limit on the actual liquid level in said at least one separator means; and comparing said tenth signal and said eleventh signal and establishing said fifth signal responsive to the difference between said tenth signal and said eleventh signal.

6. A method in accordance with claim 5 wherein said step of combining said fourth signal and said fifth signal comprises summing said fourth signal and said fifth signal.

7. A method for preventing flooding of a first and second fractional distillation column means, wherein the feed stream to said second fractional distillation column means is provided from said first fractional distillation column means, and for maintaining the liquid level in at least one separator means, from which the feed to said first fractional distillation column means is supplied, within desired limits comprising the steps of:

supplying a first feed stream to said at least one separator means;

supplying a second feed stream from said at least one separator means to said first fractional distillation column means;

supplying a third feed stream from said first fractional distillation column means to said second fractional distillation column means;

establishing a first signal representative of the predicted desired flow rate of said second feed stream required to prevent flooding of said first fractional distillation column means and said second fractional distillation column means;

establishing a second signal representative of the actual flow rate of said second feed stream;

using computing means to compare said first signal and said second signal and establish a third signal responsive to the difference between said first signal and said second signal;

manipulating the flow rate of said second feed stream in response to said third signal;

establishing a fourth signal representative of the predicted desired flow rate of said first feed stream required to prevent flooding of said first fractional distillation column means and said second fractional distillation column means;

establishing a fifth signal representative of a correction factor utilized to maintain the liquid level in said at least one separator within desired limits;

using computing means to compare said fourth signal and said fifth signal to establish a sixth signal representative of a modified predicted desired flow rate of said first feed stream required to both prevent flooding of said first fractional distillation column means and said second fractional distillation column means and required to maintain the liquid level in said at least one separator means within desired limits;

establishing a seventh signal representative of the actual flow rate of said first feed stream;

using computing means to compare said sixth signal and said seventh signal and establish an eighth signal responsive to the difference between said sixth signal and said seventh signal; and manipulating the flow rate of said first feed stream in response to said eighth signal.

8. A method in accordance with claim 7 wherein said step of establishing said fourth signal comprises:

establishing a ninth signal representative of the differential pressure across said first fractional distillation column means;

establishing a tenth signal representative of the maximum allowable differential pressure across said first fractional distillation column means to prevent flooding of said first fractional distillation column means;

comparing said ninth signal and said tenth signal and establishing an eleventh signal responsive to the difference between said ninth signal and said tenth signal;

establishing a twelfth signal representative of the concentration of at least one constituent in a stream flowing from said second fractional distillation column means;

establishing a thirteenth signal representative of the concentration of said first constituent which indicates that said second fractional distillation column means is beginning to flood;

comparing said twelfth signal and said thirteenth signal and establishing a fourteenth signal responsive to the difference between said twelfth signal and said thirteenth signal; and selecting the lower of said eleventh and fourteenth signals to establish said first signal.

9. A method in accordance with claim 7 wherein the said step of establishing said first signal comprises:

establishing a ninth signal representative of the differential pressure across said first fractional distillation column means;

establishing a tenth signal representative of the maximum allowable differential pressure across said first fractional distillation column means to prevent flooding of said first fractional distillation column means;

comparing said ninth signal and said tenth signal and establishing an eleventh signal responsive to the difference between said ninth signal and said tenth signal;

establishing a twelfth signal representative of the concentration of at least one constituent in a stream flowing from said second fractional distillation column means;

establishing a thirteenth signal representative of the concentration of said first constituent which indicates that said second fractional distillation column means is beginning to flood;

comparing said twelfth signal and said thirteenth signal and establishing a fourteenth signal responsive to the difference between said twelfth signal and said thirteenth signal;

establishing a fifteenth signal representative of the actual liquid level in said at least on separator;

establishing a sixteenth signal representative of a low limit on the liquid level in said at least one separator;

comparing said fifteenth signal and said sixteenth signals and establishing a seventeenth signal responsive to the difference between said fifteenth signal and said sixteenth signal; and selecting the lower of said eleventh, fourteenth and seventeenth signals as said first signal.

10. A method in accordance with claim 7 wherein said step of establishing said fourth signal comprises:

establishing a ninth signal representative of the ratio of the number of pounds of said first feed stream which must be supplied to said at least one separator means to supply a pound of feed to said first fractional distillation column means; and multiplying said first signal by said ninth signal to establish said fourth signal.

11. A method in accordance with claim 10 wherein said step of establishing said fifth signal comprises:

establishing a tenth signal representative of the actual liquid level in said at least one separator means;

establishing an eleventh signal representative of a high limit on the actual liquid level in said at least one separator means; and comparing said tenth signal and said eleventh signal and establishing said fifth signal responsive to the difference between said tenth signal and said eleventh signal.

12. A method in accordance with claim 11 wherein said step of combining said fourth signal and said fifth signal comprises summing said fourth signal and said fifth signal.

13. A method for preventing flooding of a fractional distillation column means and for maintaining the liquid level in first and second separator means, from which the feed to said fractional distillation column means is supplied, within desired limits comprising the steps of:

supplying a first feed stream to said first separator means;

supplying the vapor portion of said first feed stream from said first separator means to said second separator means;

supplying the liquid portion of said first feed stream as a second feed stream from said first separator means to said fractional distillation column means;

supplying the liquid in said second separator means as a third feed stream to said fractional distillation column means;

establishing a first signal representative of the predicted desired total feed flow to said fractional distillational column means required to prevent flooding of said fractional distillation column means;

establishing a second signal representative of the flow rate of said second feed stream;

establishing a third signal representative of the flow rate of said third feed stream;

using computing means to sum said second signal and said third signal to establish a fourth signal representative of the actual total feed flow rate to said fractional distillation column means;

using computing means to compare said first signal and said fourth signal and establish a fifth signal responsive to the difference between said first signal and said fourth signal;

manipulating the flow rate of said second feed stream in response to said fifth signal;

establishing a sixth signal representative of the actual liquid level in said first separator means;

establishing a seventh signal representative of the actual liquid level in said second separator means;

using computing means to compare said sixth signal and said seventh signal and establish an eighth signal responsive to the difference between said sixth signal and said seventh signal;

using computing means to combine said fifth signal and said eighth signal to establish a ninth signal;

manipulating the flow rate of said third feed stream in response to said ninth signal;

establishing a tenth signal representative of the predicted desired flow rate of said first feed stream required to prevent flooding of said fractional distillational column means;

establishing an eleventh signal representative of a correction factor utilized to maintain the liquid level in said first and second separators within desired limits;

using computing means to combine said tenth signal and said eleventh signal to establish a twelfth signal representative of a modified predicted desired flow rate of said first feed stream required to both prevent flooding of said fractional distillation column means and maintain the liquid level in said first separator means and said second separator means within desired limits;

establishing a thirteenth signal representative of the actual flow rate of said first feed stream;

using computing means to compare said twelfth signal and said thirteenth signal and establish a fourteenth signal responsive to the difference between said twelfth signal and said thirteenth signal; and manipulating the flow rate of said first feed stream in response to said fourteenth signal.

14. A method in accordance with claim 13 wherein said step of establishing said first signal comprises:

establishing a ninth signal representative of the differential pressure across said fractional distillation column means;

establishing a tenth signal representative of the maximum allowable differential pressure across said fractional distillation column means to prevent flooding of said fractional distillation column means; and comparing said ninth signal and said tenth signal and establishing said first signal responsive to the difference between said ninth signal and said tenth signal.

15. A method in accordance with claim 13 wherein said step of establishing said first signal comprises:

establishing a ninth signal representative of the concentration of at least one constituent in a stream flowing from said fractional distillation column means;

establishing a tenth signal representative of the concentration of said first constituent which indicates that said fractional distillation column means is beginning to flood; and comparing said ninth signal and said tenth signal and establishing said first signal responsive to the difference between said ninth signal and said tenth signal.

16. A method in accordance with claim 13 wherein said step of combining said fifth signal and said eighth signal to establish said ninth signal comprises:

establishing a fifteenth signal representative of the ratio of the density of the fluid in said second separator means multiplied by the volume of the fluid in said second separator means to the density of the fluid in said first separator means multiplied by the volume of the fluid in said first separator means;

multiplying said fifth signal by said fifteenth signal to establish a sixteenth signal; and summing said eighth signal and said sixteenth signal to establish said ninth signal.

17. A method in accordance with claim 16 wherein said step of establishing said tenth signal comprises:

establishing a seventeenth signal representative of the ratio of the number of pounds of said first feed stream which must be supplied to said first separator means to supply a pound of feed to said fractional distillation column means; and multiplying said first signal by said seventeenth signal to establish said tenth signal.

18. A method in accordance with claim 17 wherein said step of establishing said eleventh signal comprises:

establishing an eighteenth signal representative of the actual liquid level in said first separator means;

establishing a nineteenth signal representative of a high limit on the actual liquid level in said first separator means; and comparing said eighteenth signal and said nineteenth signal and for establishing said eleventh signal responsive to the difference between said eighteenth signal and said nineteenth signal.

19. A method in accordance with claim 18 wherein said step of combining said tenth signal and said eleventh signal comprises summing said tenth signal and said eleventh signal.

* * * * *

UNITED STATES PATENT AND TRADEMARK OFFICE
CERTIFICATE OF CORRECTION

PATENT NO. : U.S. 4,302,229
DATED : November 24, 1981
INVENTOR(S) : John E. Anderson It is certified that error appears in the above-identified patent and that said Letters Patent are hereby corrected as shown below:

Column 16, claim 7, line 50, after "to", "compare" should be --- combine ---.

Column 17, claim 9, after "wherein", delete "the".

Column 20, claim 18, lines 36 and 39, after "said", "nineteeth" should be --- nineteenth ---.

Signed and Sealed this

Twenty-seventh Day of April 1982

[SEAL]

Attest:

GERALD J. MOSSINGHOFF

Attesting Officer        Commissioner of Patents and Trademarks